(12) United States Patent
Hirayama et al.

(10) Patent No.: US 9,919,945 B2
(45) Date of Patent: Mar. 20, 2018

(54) LASER PROCESSING METHOD AND LASER PROCESSING APPARATUS

(71) Applicant: Mitsubishi Electric Corporation, Chiyoda-ku (JP)

(72) Inventors: Reona Hirayama, Chiyoda-ku (JP); Shuichi Fujikawa, Chiyoda-ku (JP); Tomotaka Katsura, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/029,093

(22) PCT Filed: Oct. 10, 2014

(86) PCT No.: PCT/JP2014/077213
§ 371 (c)(1),
(2) Date: Apr. 13, 2016

(87) PCT Pub. No.: WO2015/072259
PCT Pub. Date: May 21, 2015

(65) Prior Publication Data
US 2016/0251251 A1 Sep. 1, 2016

(30) Foreign Application Priority Data

Nov. 14, 2013 (JP) ................................ 2013-235910

(51) Int. Cl.
*C03B 33/02* (2006.01)
*C03B 33/07* (2006.01)
(Continued)

(52) U.S. Cl.
CPC ...... *C03B 33/0222* (2013.01); *B23K 26/0006* (2013.01); *B23K 26/382* (2015.10);
(Continued)

(58) Field of Classification Search
CPC . C03B 33/0222; C03B 33/074; C03B 33/082; B23K 26/0006; B23K 26/382;
(Continued)

(56) References Cited

U.S. PATENT DOCUMENTS 6,388,231 B1 * 5/2002 Andrews ............ B23K 26/0846
219/121.61
6,596,968 B2 * 7/2003 Yamamoto ............. C08G 73/10
219/121.71
(Continued)

FOREIGN PATENT DOCUMENTS

EP 2 708 355 A1 3/2014
JP 11-58061 3/1999
(Continued)

OTHER PUBLICATIONS

International Search Report dated Jan. 13, 2015 in PCT/JP2014/077213 filed Oct. 10, 2014.
(Continued)

*Primary Examiner* — Queenie S Dehghan
(74) *Attorney, Agent, or Firm* — Oblon, McClelland, Maier & Neustadt, L.L.P.

(57) ABSTRACT

A laser processing method that can reduce warpage occurring in a glass and reduce a stress generated on the glass at a time of releasing a protective material from the glass. The laser processing method includes: forming the protective materials on both surfaces of the glass; processing the glass by radiating a laser beam onto the glass together with the protective materials after the protective material formation; and releasing the protective materials from the glass after the laser processing.

9 Claims, 13 Drawing Sheets

(51) Int. Cl.
    *C03B 33/08*     (2006.01)
    *B23K 26/382*     (2014.01)
    *B23K 26/40*     (2014.01)
    *B23K 26/00*     (2014.01)
    *B23K 103/00*     (2006.01)

(52) U.S. Cl.
    CPC ............ *B23K 26/40* (2013.01); *C03B 33/074* (2013.01); *C03B 33/082* (2013.01); *B23K 2203/50* (2015.10); *B23K 2203/54* (2015.10)

(58) Field of Classification Search
    CPC . B23K 26/40; B23K 2203/54; B23K 2203/50
    See application file for complete search history.

(56) References Cited

U.S. PATENT DOCUMENTS

2005/0242073 A1* 11/2005 Nakamura ........... B23K 26/032
                                                                        219/121.72

2010/0078418 A1* 4/2010 Lei ..................... B23K 26/18
                                                                        219/121.72

FOREIGN PATENT DOCUMENTS

| | | |
|---|---|---|
| JP | 2004-186635 | 7/2004 |
| JP | 2005-268325 | 9/2005 |
| JP | 2005-313188 | 11/2005 |
| JP | 2006-175509 | 7/2006 |
| JP | 2011-224642 | 11/2011 |
| JP | 2012-25614 | 2/2012 |
| JP | 2012-254627 | 12/2012 |
| JP | 2013-193106 | 9/2013 |
| JP | 2014-214036 | 11/2014 |
| KR | 10-2010-0087565 A | 8/2010 |

OTHER PUBLICATIONS

Office Action dated Mar. 29, 2017 in Korean Patent Application No. 10-2016-7009731 (with partial English language translation).

* cited by examiner

1

LASER PROCESSING METHOD AND LASER PROCESSING APPARATUS

TECHNICAL FIELD

The present invention relates to a laser processing method for radiating and a laser processing apparatus configured to radiate a laser beam to an object to be processed, to thereby process the object to be processed.

BACKGROUND ART

In recent years, components have become more and more miniaturized and complex along with downsizing of electric devices and electronic devices. Therefore, higher accuracy is required in laser drilling and cutting for various kinds of materials. In machine processing using a drill or a die, it is becoming more difficult to meet a requirement of higher accuracy for reasons such as tool wear.

In laser processing, non-contact micro-processing can be performed on an object to be processed. However, a molten debris and a scattered debris of the object to be processed, which are generated during the laser processing, adhere to a surface of the object to be processed, and therefore are required to be removed. Hence, in a post-step, etching such as desmear is required, resulting in increase in number of steps and costs.

In this regard, as a laser processing method capable of preventing the adhesion of the molten debris and the scattered debris, which are generated during the laser processing, to the object to be processed, there is hitherto known a laser processing method involving radiating a laser beam to the object to be processed together with a protective material under a state in which the protective material is bonded onto a surface of the object to be processed, to thereby process the object to be processed (see, for example, Patent Literature 1).

CITATION LIST

Patent Literature

[PTL 1] JP 59-76688 A

SUMMARY OF INVENTION

Technical Problem

In order to increase an energy density of the laser beam, however, a thickness of the protective material is required to be set large so as to sufficiently ensure heat resistance of the protective material. As a result of increase in thickness of the protective material, there arise problems in occurrence of significant warpage in the object to be processed onto which the protective material is bonded and generation of a significant stress on the object to be processed at time of releasing the protective material from the object to be processed.

The present invention has been made to provide a laser processing method and a laser processing apparatus, which are capable of reducing warpage occurring in an object to be processed and reducing a stress generated on the object to be processed at time of releasing a protective material from the object to be processed.

Solution to Problem

According to one embodiment of the present invention, there is provided a laser processing method, including: a protective material formation step of forming protective materials on a glass so that the protective materials are superimposed on both surfaces of the glass; a laser processing step of processing the glass by radiating a laser beam onto the glass together with the protective materials after the protective material formation step; and a protective material releasing step of releasing the protective materials from the glass after the laser processing step.

Advantageous Effects of Invention

According to the laser processing method of the one embodiment of the present invention, under a state in which the protective materials are formed on both the surfaces of the glass, the laser beam is radiated onto the glass together with the protective materials. Thereafter, the protective materials are released from the glass. Therefore, even in a case where the thickness of each of the protective materials is increased so as to increase an energy density of the laser beam, warpage occurring in the glass when the protective materials are formed on the glass can be reduced, while the stress generated on the glass when the protective materials are released from the glass can be reduced.

DESCRIPTION OF EMBODIMENTS

First Embodiment

As purposes of micro-hole processing on a glass formed in a thin plate shape, there is use for a through electrode in a thin plate for an intermediate substrate, which is configured to conductively connect a semiconductor chip and a package substrate to each other. Along with enhancement in performance and functionalization of electronic devices, a density of a printed board becomes higher and higher. Although a main material of the board is a resin, a glass having a small thermal expansion coefficient and high insulating properties is expected as an alternative material.

Figure 1:
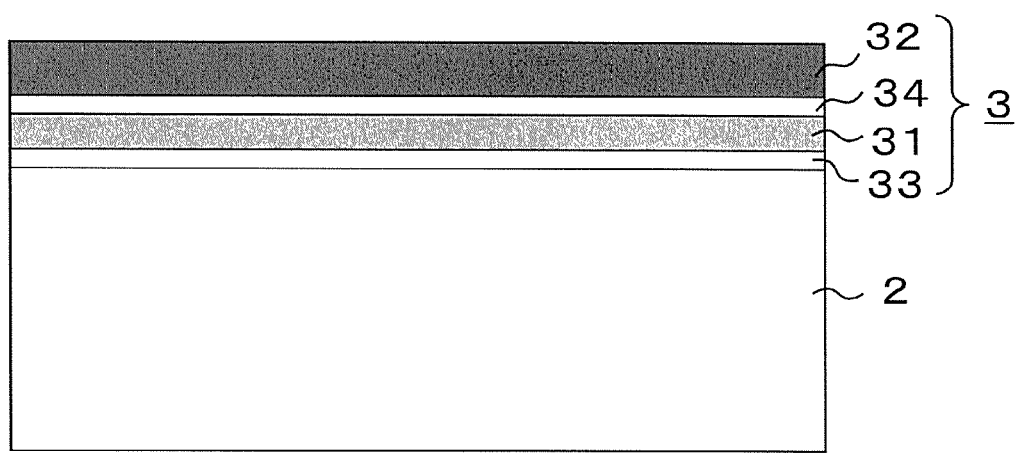
FIG. 1 is a side view for illustrating a glass with a protective material according to a first embodiment of the present invention.

FIG. 1 is a side view for illustrating a glass with a protective material according to a first embodiment of the present invention. A glass 1 with a protective material (object to be processed with protective material) includes a glass (object to be processed) 2 formed into a thin plate shape, and a protective material 3 formed on a front surface of the glass 2. The protective material 3 prevents a molten debris and a scattered debris of the glass 2, which are generated from the glass 2 when a laser beam is radiated onto the glass 2, from adhering to the glass 2.

The protective material 3 includes two base materials 31 and 32, and adhesives 33 and 34 in two layers. The adhesive 33 is applied over a front surface of the glass 2. The base material is bonded onto the front surface of the glass 2 through intermediation of the adhesive 33. The adhesive 34 is applied over a surface of the base material 31, which is on a side opposite to the glass 2. The base material 32 is bonded to the base material 31 through intermediation of the adhesive 34. In other words, the protective material 3 is formed on the glass 2 so that the superimposed two base materials 31 and 32 are superimposed on the glass 2. Although a structure of the protective material 3 including the two base materials 31 and 32 is described in this example, the protective material 3 may have a structure including three or more base materials. Even in this case, the protective material is formed on the glass so that the superimposed three or more base materials are superimposed on the glass 2.

A thickness of the glass 2 is set to 300 μm or smaller. With a laser processing method of radiating a laser beam to the glass 2 under a high-energy density condition, heat resistance is maintained and warpage of the glass 1 with the protective material is suppressed by the formation of the protective material 3 including the two base materials 31 and 32 on the glass 2. Further, even by placing the glass 1 with the protective material on a flat stage base and fixing the glass 1 with the protective material onto the stage base, the warpage of the glass 1 with the protective material can be suppressed. When the protective material 3 is released from the glass 2, the two base materials 31 and 32 are released one by one. Accordingly, a stress applied to the glass 2 is relaxed to reduce generation of cracks in the glass 2. As a result, the molten debris and the scattered debris do not adhere to the glass 2. In addition, laser processing on the glass 2 for a uniform processed shape can be performed.

A thickness of the protective material 3 is set to 500 μm or smaller. A thickness of an intermediate substrate is set to about 50 μm to about 300 μm.

Selection of the protective material 3 is determined depending on a material of the glass 2 and laser processing conditions. The protective material 3 is required to have sufficient heat resistance to the radiation of the laser beam. The term "sufficient heat resistance" herein means that the base materials 31 and 32 are scarcely deformed at the time of laser processing on the protective material 3, the protective material 3 is resistant enough to heat of the laser beam so as not to be burnt, and the protective material 3 is not burnt out by the heat of the laser beam so as not to expose the front surface of the glass 2.

When the heat resistance of the protective material 3 is not sufficiently ensured, it becomes difficult to remove the molten debris and the scattered debris of the glass 2 by using the protective material 3. Further, a heat-affected zone is formed on the glass 2, or a crack is formed in the glass 2.

In a case where a low energy density is set for the energy density of the laser beam as the laser processing condition, sufficient heat resistance is obtained even with the protective material 3 having a small thickness. Hence, the adhesion of the molten debris and the scattered debris to the glass 2 can be prevented.

In a case where a high energy density is set for the energy density of the laser beam as the laser processing condition, however, a material of the protective material 3 is required to be changed to another material having sufficient heat resistance, or the thickness of the protective material 3 is required to be increased so that the protective material 3 has sufficient heat resistance. This is because the protective material 3 cannot resist to the heat of the laser beam to cause deterioration of the protective material 3, failing to prevent the adhesion of the molten debris and the scattered debris to the glass 2.

Figure 2:
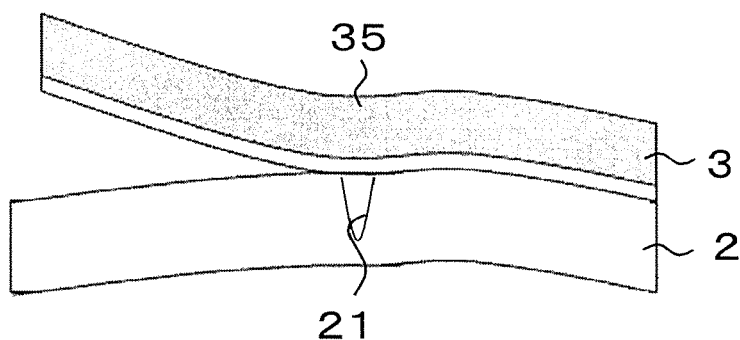
FIG. 2 is a side view for illustrating a state in which the protective material having a large thickness is being released from the glass.
Figure 3:
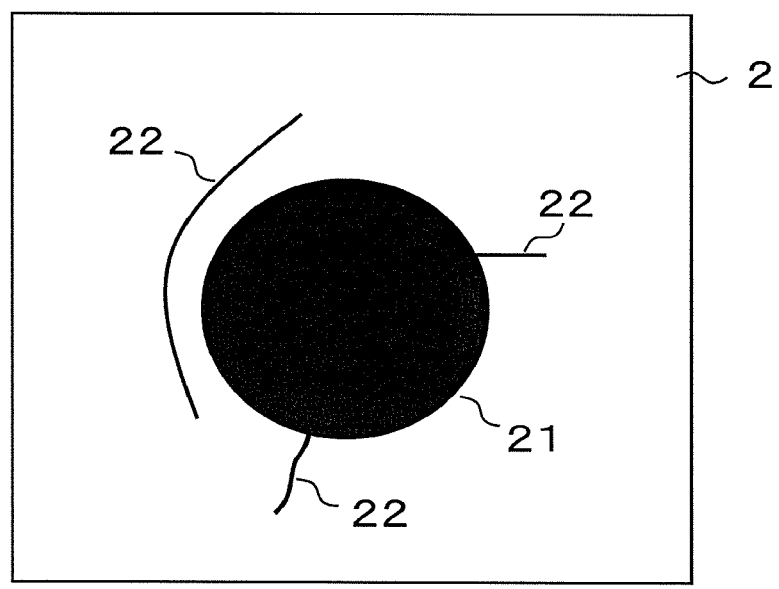
FIG. 3 is a plan view for illustrating the glass after the protective material illustrated in FIG. 2 is released.

FIG. 2 is a side view for illustrating a state in which the thick protective material 3 is being released from the glass 2, and FIG. 3 is a plan view for illustrating the glass 2 after the protective material 3 illustrated FIG. 2 is released. In a case where the glass 2 having a small thickness of 300 μm or smaller used for the intermediate substrate, which is made of a hard and brittle material, is subjected to laser processing, when a thickness dimension of the protective material 3 is large, a stress is applied to the glass 2 at the time of releasing the protective material 3 from the glass 2. As a result, a crack 22 is sometimes generated at a drilled hole 21 formed in the glass 2 or in a portion around the drilled hole 21 formed in the glass 2.

Figure 4:
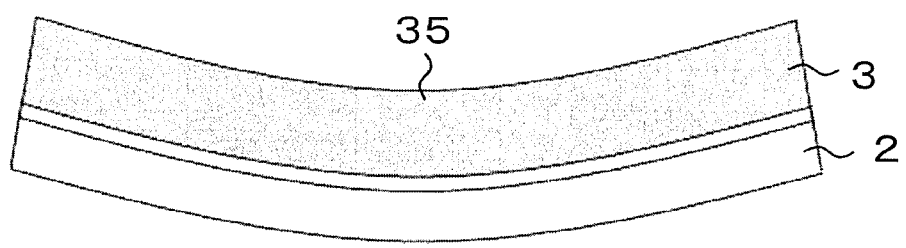
FIG. 4 is a side view for illustrating a state after the protective material having a large thickness is bonded onto the glass.

FIG. 4 is a side view for illustrating a state after the protective material 3 having a large thickness is bonded onto the glass 2. When the thickness of the protective material 3 is large, warpage sometimes occurs in the glass 2 at the time of bonding the protective material 3 onto the glass 2. The warpage is considered to be caused due to a tensile strength that is applied to the glass 2 while the protective material 3 is being bonded onto the glass 2 and a stress that is applied to the glass 2 while the protective material 3 is being bonded onto the glass 2. In particular, when a worker manually bonds the protective material 3 onto the glass 2, the protective material 3 contracts in a direction of bonding to cause the warpage in the protective material 3. A warping direction and a warping amount in the glass 1 with the protective material differs depending on a material of the glass 2, the thickness of the glass 2, a material of the protective material 3, the thickness of the protective material 3, and an adhesive force between the glass 2 and the protective material 3.

Even under the laser processing conditions set for high quality, there is a problem in that processing quality is lowered due to the occurrence of the warpage or the generation of the crack 22, which is caused due to the protective material 3.

Thus, there is a problem in difficulty of satisfaction of three conditions at a time, specifically, the protective material 3 having sufficient heat resistance, the suppression of warpage of the glass 1 with the protective material at the time of bonding the protective material 3 onto the glass 2, and the suppression of generation of the crack 22 at the time of releasing the protective material 3 from the glass 2.

In the present invention, the protective material 3 includes the two base materials 31 and 32, and the adhesives 33 and 34 in the two layers. The protective material 3 has a sufficient thickness to have the heat resistance by including the two base materials 31 and 32. Further, as compared with the warping amount generated in the glass 2 by the protective material 3 including a single base material 35 having a large thickness as illustrated in FIG. 2 and FIG. 4, the warping amount generated in the glass 2 can be reduced by the protective material 3 including the two base materials 31 and 32 as illustrated in FIG. 1 to have the same overall thickness.

A thickness of each of the base materials 31 and 32 needs to be equal to or smaller than the thickness of the glass 2. It is desired that the base materials 31 and 32 be superimposed perpendicularly to the front surface of the glass 2.

When the protective material 3 and the glass 2 are viewed from above, the area of the protective material 3 may be larger than the area of the glass 2. However, when the glass 1 with the protective material is significantly larger than the stage base, warpage occurs in a portion of the protective material 3, which extends beyond the stage base, due to self-weight. In order to prevent the warpage, the protective material 3 is limited to be slightly larger than the stage base on which the glass 2 is to be fixed.

As materials of the base materials 31 and 32, for example, there are polymer films made of polyethylene terephthalate, polyethylene naphthalate, and the like.

Sizes of the base materials 31 and 32 are not required to be the same. However, each of the base materials 31 and 32 is required to have a size large enough to reliably cover a portion of the glass 2, which is subjected to the laser processing, under a state in which the base materials 31 and 32 are superimposed.

The thickness of each of the base materials 31 and 32 is set based on a precondition that the laser processing can be performed on the glass 2 when the protective material 3 is irradiated with the laser beam.

As materials of the adhesives 33 and 34, for example, there are given rubber-based materials, silicone-based materials, acrylic materials, and the like. The materials of the adhesives 33 and 34 are temporarily bondable or releasable.

A bonding range of the adhesive 33 applied onto the glass 2 is required to be larger than the portion of the glass 2, which is subjected to the laser processing.

A thickness of each of the adhesives 33 and 34 is desired to be 20 µm or smaller depending on a pressure-sensitive adhesive strength of the used material. The pressure-sensitive adhesive strength of the adhesives 33 and 34 only needs to provide a certain degree of adhesion between the glass 2 and the base material 31 and between the base materials 31 and 32. The pressure-sensitive adhesive strength of the adhesives 33 and 34 is desired to be from 0.05 N/20 mm to 1.0 N/20 mm.

The base materials 31 and 32 are not required to be the same in material and thickness. Further, the adhesives 33 and 34 are not required to be the same in material and thickness. In particular, in a combination of the base materials 31 and 32, the thicknesses of the base materials 31 and 32 may be different from each other. It is desired that each of the base materials 31 and 32 and the adhesives 33 and 34 have a uniform overall thickness.

Figure 5:
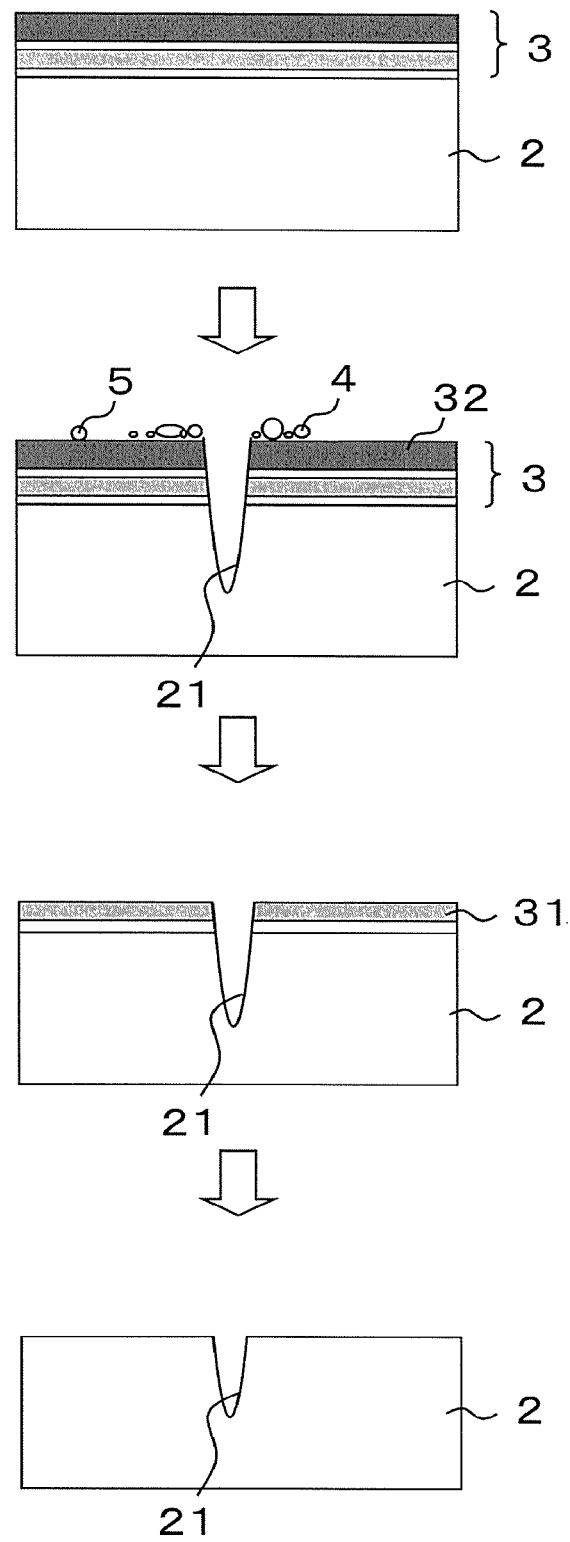
FIG. 5 is a diagram for illustrating formation of a blind hole as a drilled hole in the glass by using a laser processing method according to the first embodiment of the present invention.
Figure 6:
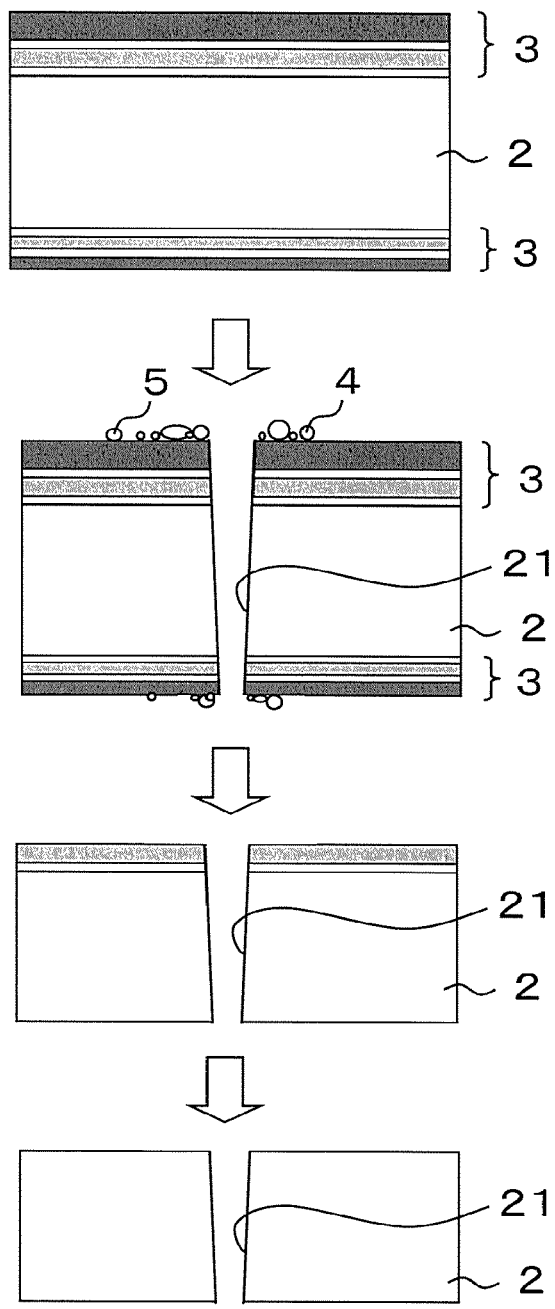
FIG. 6 is a diagram for illustrating formation of a through-hole as the drilled hole in the glass by using the laser processing method according to the first embodiment of the present invention.

Next, a laser processing method for forming a micro-hole in the glass 2 is described. FIG. 5 is a diagram for illustrating formation of a blind hole as the drilled hole 21 in the glass 2 by using the laser processing method according to the first embodiment of the present invention, and FIG. 6 is a diagram for illustrating formation of a through-hole as the drilled hole 21 in the glass 2 by using the laser processing method according to the first embodiment of the present invention. First, a method of bonding the protective material 3 onto the glass 2 is described. The protective material 3 is bonded onto one or both of surfaces of the glass 2 (protective material formation step). In a case where blind hole processing or scribe processing is performed on the glass 2, the protective material 3 is bonded onto only one of the surfaces of the glass 2. In a case where through-hole processing or cutting is performed on the glass 2, the protective materials 3 are bonded to both of the front surface and the back surface of the glass 2. This is because a molten debris 4 and a scattered debris 5 adhere not only to the front surface but also to the back surface to render the release difficult in a case where the through-hole processing or cutting is performed on the glass 2.

A thickness of the protective material 3 to be bonded onto the back surface of the glass 2 may be equal to or smaller than a thickness of the protective material 3 to be bonded onto the front surface of the glass 2.

As a method of bonding the protective material 3 onto the glass 2, there are given a method of manually bonding the protective material 3 including the adhesives 33 and 34 adhering to the base materials 31 and 32 in advance onto the glass 2 through roll-to-roll processing or the like, a bonding method using a vacuum laminator, which is carried out under a state in which the base material 32, the adhesive 34, the base material 31, the adhesive 33, and the glass 2 are superimposed in the stated order from the top, and the like. In this case, adhesive sheets may be used as the adhesives 33 and 34.

Figure 7:
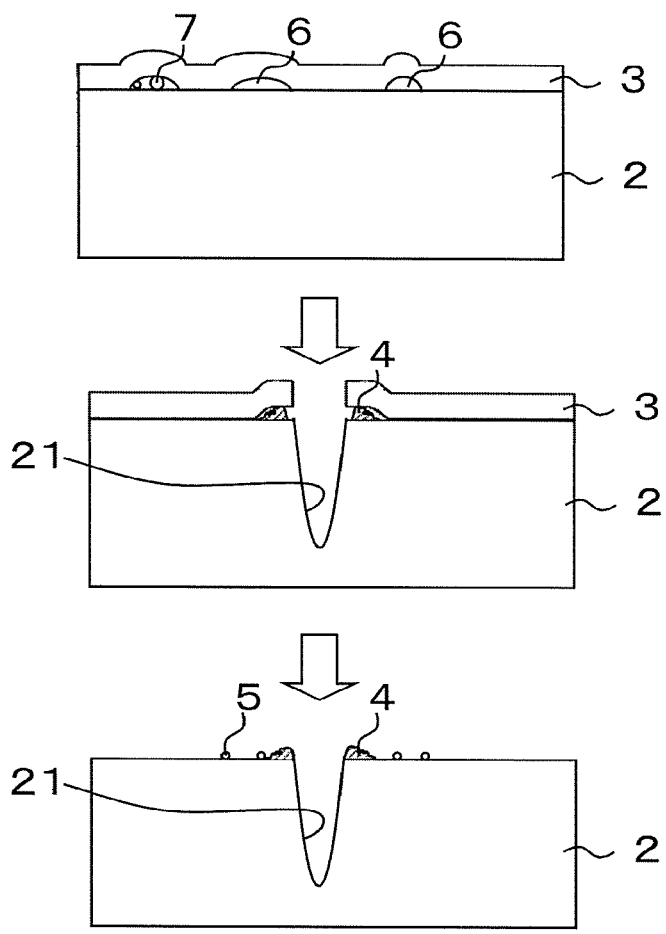
FIG. 7 is a diagram for illustrating formation of a blind hole as the drilled hole in the glass under a state in which air bubbles and a foreign substance are present between the protective material and the glass.
Figure 8:
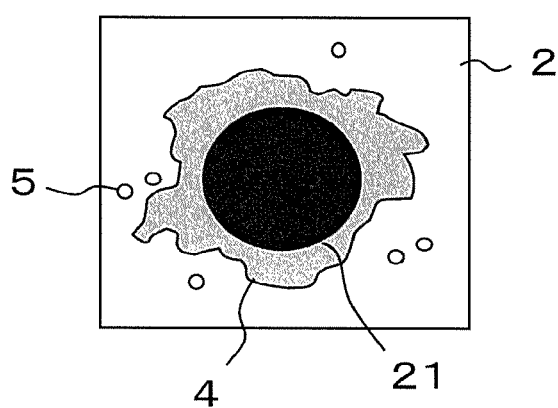
FIG. 8 is a plan view for illustrating the glass after the formation of the drilled hole illustrated in FIG. 7.

As a caution for bonding the protective material 3 onto the glass 2, there is prevention of presence of waste (foreign substance) such as air bubbles and dust between the glass 2 and the protective material 3. FIG. 7 is a diagram for illustrating formation of the blind hole as the drilled hole 21 in the glass 2 under a state in which air bubbles 6 and dust 7 are present between the protective material 3 and the glass 2. FIG. 8 is a plan view for illustrating the glass 2 after the formation of the drilled hole 21 illustrated in FIG. 7. When the air bubbles 6 and the dust 7 are present between the glass 2 and the protective material 3, the molten debris 4 and the scattered debris 5 of the glass 2 generated during the laser processing are caught in a gap between the glass 2 and the protective material 3. As a result, the molten debris 4 and the scattered debris 5 are deposited on the front surface of the glass 2. In this case, a function of the protective material 3 to prevent the adhesion of the molten debris 4 and the scattered debris 5 to the glass 2 is not satisfactorily fulfilled. Therefore, when the protective material 3 including the adhesives 33 and 34 already adhering to the base materials 31 and 32 is used to fulfill the function, the protective material including the adhesives 33 and 34 respectively applied over the entire surfaces of the base materials 31 and 32 is used.

In a case where the thickness of the protective material 3 is set larger than that of the glass 2 to suppress the warpage of the glass 2, which may occur at the time of bonding the protective material 3 onto the glass 2, the base materials are bonded onto the glass 2 one by one.

Figure 9:
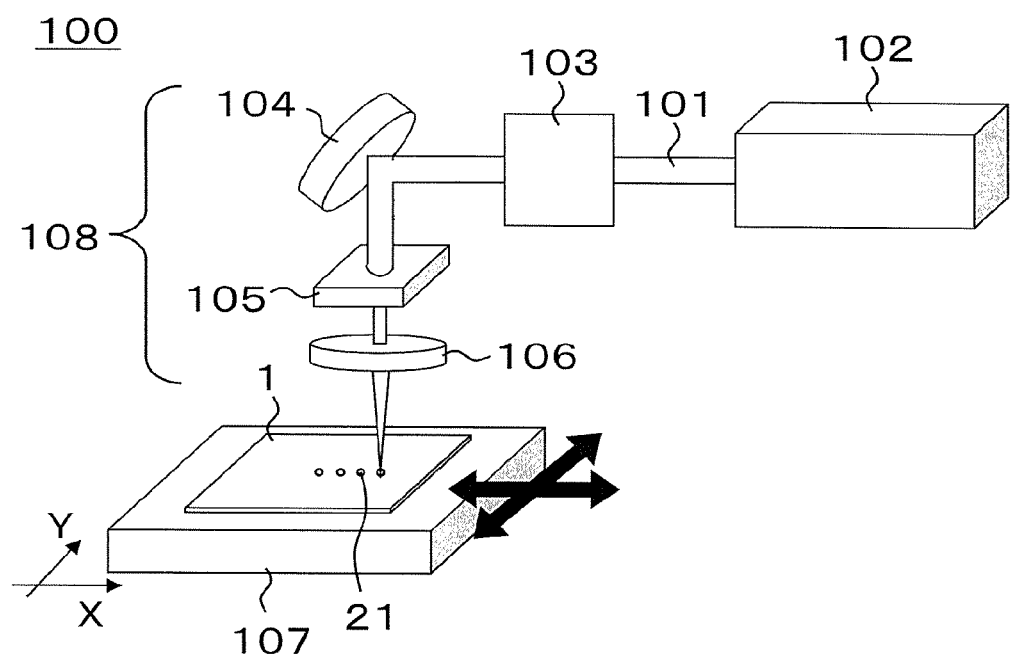
FIG. 9 is a perspective view for illustrating a laser processing apparatus to be used for the laser processing method according to the first embodiment of the present invention.

Next, a laser processing method of radiating the laser beam to the protective material 3 and the glass 2 is described. FIG. 9 is a perspective view of a laser processing apparatus 100 to be used for the laser processing method according to the first embodiment of the present invention. The laser processing apparatus 100 includes a laser oscillator 102 configured to output a laser beam 101, a beam adjusting optical system 103 configured to adjust the laser beam 101 output from the laser oscillator 102, a mirror 104 configured to reflect the laser beam 101 adjusted by the beam adjusting optical system 103, a mask 105 configured to shape a profile of the laser beam 101 reflected by the mirror 104, a condenser lens 106 configured to condense the laser beam 101 shaped by the mask 105, a stage base 107 configured to support the glass 1 with the protective material to be irradiated with the laser beam 101 condensed through the condenser lens 106, and a conveyance apparatus (not shown) configured to convey the stage base 107. The laser oscillator 102, the beam adjusting optical system 103, the mirror 104, the mask 105, and the condenser lens 106 construct a laser radiating apparatus 108.

The beam adjusting optical system 103 is configured to adjust a size of abeam diameter of the laser beam 101 and to shape the beam profile of the laser beam 101. The beam adjusting optical system 103 includes a combination of a concave lens and a convex lens. For the optical system configured to shape the beam into an elliptical beam or the like, a cylindrical lens, a prism, a diffraction optical element, or the like may be used.

The mask 105 is made of a material such as copper. In the center of the mask 105, a through-hole having a circular or elliptical shape smaller than the beam diameter of the laser beam 101 to be radiated onto the mask 105 is formed. The laser beam 101 is shaped into the shape of the through-hole by passage of the laser beam 101 through the mask 105. The laser radiating apparatus 108 is not required to include the mask 105.

The laser beam 101 shaped through the mask 105 is condensed through the condenser lens 106 onto a laser-beam incident surface of the glass 1 with the protective material to scan the stage base 107. In this manner, the micro-drilled hole 21 is formed in the glass 2 (laser processing step).

Although the blind hole processing for forming the blind hole as the drilled hole 21 is illustrated in FIG. 9, the laser processing method is also applicable to the through-hole processing and the cutting.

For the scanning relative to the glass 2 with the laser beam 101 to be radiated onto the glass 2, the same effects are obtained even when the stage base 107 is fixed and the laser beam is scanned by using a Galvano mirror, a polygon mirror, or the like. In this case, the radiation needs to be performed using an fθ lens as the condenser lens.

A position at which the laser beam 101 is condensed may be any of positions on a front surface of the protective material 3, inside the protective material 3, on the front surface of the glass 2, and inside the glass 2, and may be adjusted depending on a size and a depth of the drilled hole to be formed.

An assist gas may be used for the laser processing. The assist gas is a protective gas to be used not only for releasing of the molten debris 4 and cooling a sample during the laser processing but also for preventing the adhesion of the molten debris 4 to the condenser lens 106. As the assist gas, air, nitrogen, an argon gas, and the like are given. As a method of causing the assist gas to flow, there are a method of causing the assist gas to flow between the condenser lens 106 and the glass 2, a method of using a nozzle to cause the assist gas to flow on the same axis as that of the laser beam 101, and the like.

As a laser beam for micro-hole processing on the glass 2, the laser beam 101 having a wavelength falling in an absorption range of the glass 2 is preferred. In particular, a pulse $CO_2$ laser is preferred. The $CO_2$ laser is low in running cost and is advantageous in terms of reliability as compared with a solid-state laser. Further, as compared with a continuous wave (CW) laser, the pulse laser can radiate energy in a concentrated manner in terms of time. Therefore, processing to a larger depth can be performed locally. In particular, the above-mentioned laser is suitable to form micro-holes.

As the laser oscillator 102, an orthogonal triaxial type $CO_2$ laser oscillator configured to generate a pulse by a gain switch is preferred to be used. In the orthogonal triaxial type, the sectional area of a gas channel is large. As a result, a high output is obtained at a low gas pressure and a low gas flow rate. Further, with the method of generating the pulse by the gain switch, excitation discharge is intermittently performed. A consumable gas remaining between discharge electrodes after monopulse oscillation is filled with a new laser gas so that a subsequent pulse is generated in subsequent excitation discharge to perform the pulse oscillation. As a result, an output at a peak becomes higher. As the laser for micro-hole processing on the glass, an orthogonal triaxial type $CO_2$ laser having a high peak and a short pulse, which is configured to generate the pulse by the gain switch, and is low in running cost, is suitably used.

The glass 2 that is a target to be processed is a brittle material, which includes borosilicate glass, soda glass, alkali glass, alkali-free glass, and synthetic silica as kinds. In the laser micro-hole processing on the glass 2 according to the present invention, the processing cannot be performed when the material of the glass 2 to be processed does not have a light absorption range in a wavelength range of a laser wavelength. As the glass 2, the glass that absorbs the laser beam 101 with respect to a wavelength of the used $CO_2$ laser is suitable.

The laser beam 101 may be radiated onto any one of the front surface and the back surface of the glass 2 or both of the front surface and the back surface of the glass in the case of the through-hole processing or cutting. Further, in the case of the through-hole processing or cutting, the processing is performed under a state in which a back surface portion on a side opposite to a side to be irradiated is not brought into contact with the stage base 107. This is because as follows. Although the molten debris 4 of the glass 2 passes through the drilled hole 21 from the front surface side to the back surface side of the glass 2 during the through-hole processing or cutting, it becomes difficult for the molten debris 4 of the glass 2 to pass through the drilled hole 21 when the back surface of the glass 2 is held in contact with the stage base 107. Thus, the molten debris 4 sometimes adheres not only to the protective material 3 but also to a periphery of the drilled hole 21 on the back surface of the glass 2. Further, heat is less likely to be exhausted. As a result, a heat-affected zone is formed on the glass 2 or the crack 22 is generated therein in some cases.

Figure 10:
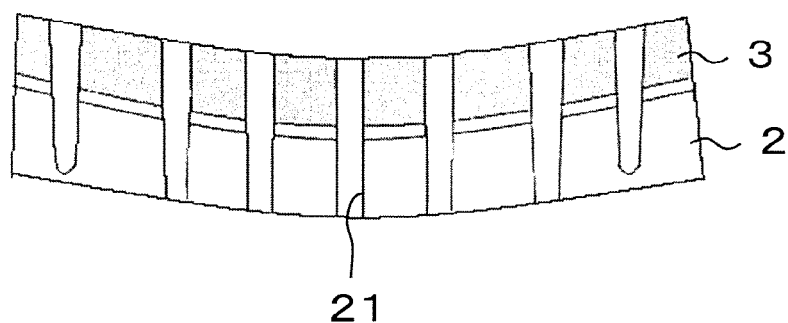
FIG. 10 is a side view for illustrating the glass with the protective material onto which a laser beam is radiated in a warped state.
Figure 11:
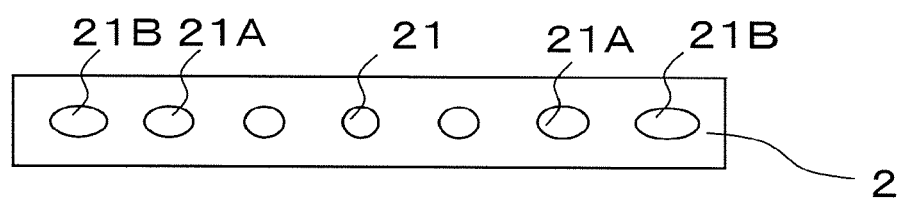
FIG. 11 is a plan view for illustrating the glass after the protective material is removed from the glass with the protective material illustrated in FIG. 10.
Figure 12:
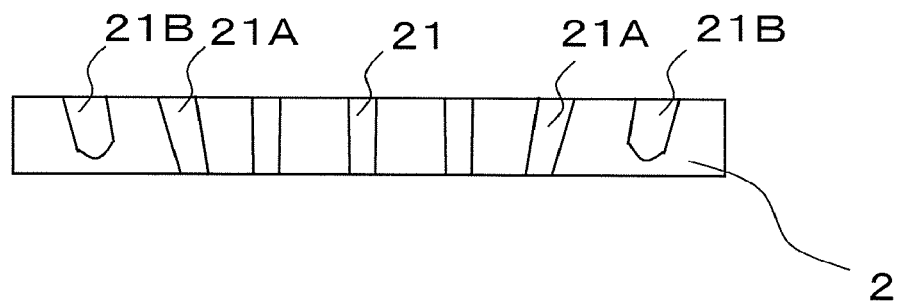
FIG. 12 is a sectional view for illustrating the glass illustrated in FIG. 11.

FIG. 10 is a sectional view for illustrating the glass 1 with the protective material onto which the laser beam 101 is radiated in a warped state, FIG. 11 is a plan view for illustrating the glass 2 after the protective material 3 is removed from the glass 1 with the protective material illustrated in FIG. 10, and FIG. 12 is a sectional view for illustrating the glass 2 illustrated in FIG. 11. In FIG. 10 to FIG. 12, a case where the through-holes are formed as the drilled holes 21 is illustrated. When the glass 1 with the protective material is warped, a focal point of the laser beam 101 on the front surface of the glass 2 differs depending on a processing position. Therefore, the drilled holes 21 vary in size. Further, some of the drilled holes 21 do not have perfect circular shapes but have elliptical shapes. Further, there arises a problem of variation in processing in that the drilled hole 21 is inclined with respect to the front surface of the glass 2. As a result, through-holes 21A that are inclined with respect to the front surface of the glass 2 are undesirably formed. Further, a variation occurs in depth of the drilled holes 21. As a result, some of the drilled holes 21 are formed obliquely with respect to the front surface of the glass 2. Thus, there also arises a problem in that blind holes 21B inclined with respect to the front surface of the glass 2 are generated instead of the through-holes in some cases. In particular, the problem is liable to occur in a case where the energy density is in the vicinity of a threshold value in the laser processing on the glass 2.

As illustrated in FIG. 9, as the stage base 107, a leveled stage base having a large degree of flatness is suitable. Even when the protective material 3 includes two or more plurality of base materials 31 and 32, the glass 1 with the protective material is slightly warped in some cases. In particular, the glass 2 having a thin plate shape of 75 µm or smaller is sometimes warped depending on the thickness of the protective material 3. In this case, however, by releasing the protective material 3 from the glass 2, the glass 2 becomes flat without being broken. Thus, by fixing the glass 1 with the protective material onto the stage base 107 under a state in which the warpage is reduced, the problem is solved.

Figure 13:
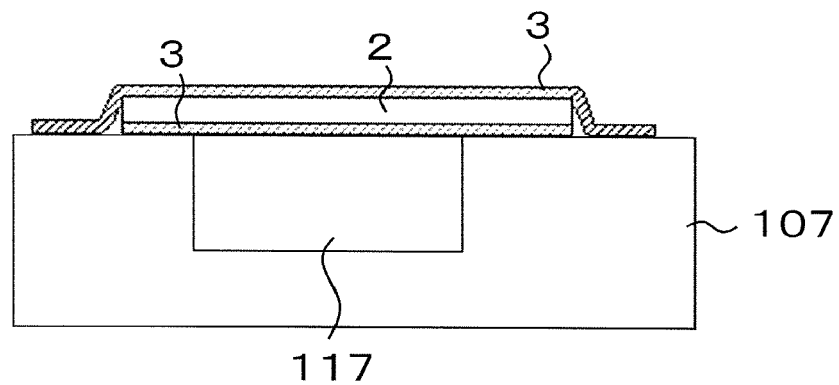
FIG. 13 is a view for illustrating a method of fixing the glass with the protective materials onto a stage base illustrated in FIG. 9 in a flat state.
Figure 14:
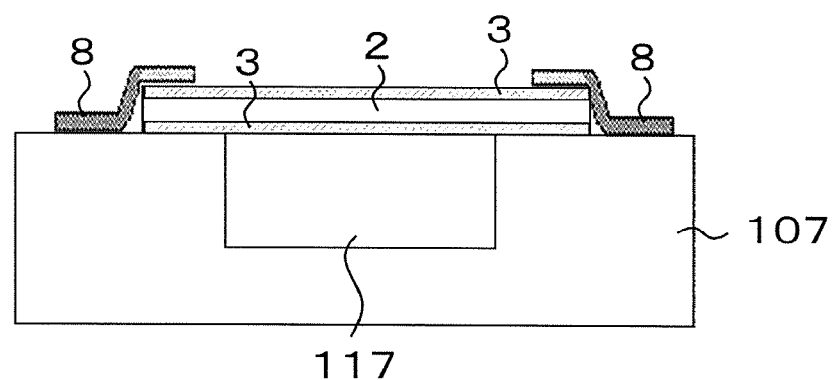
FIG. 14 is a view for illustrating a method of fixing the glass with the protective materials onto the stage base illustrated in FIG. 9 in a flat state.
Figure 15:
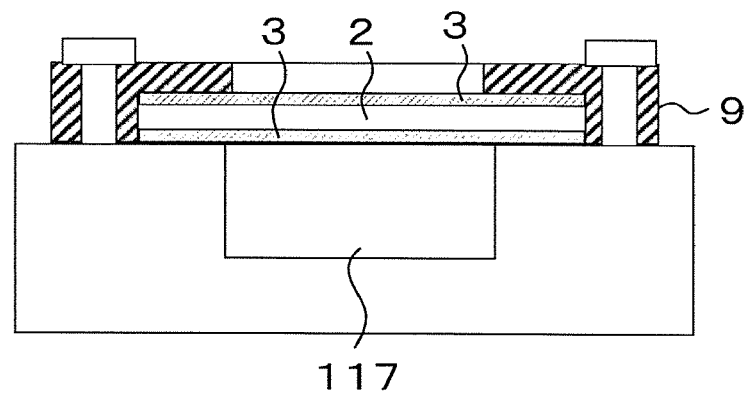
FIG. 15 is a view for illustrating a method of fixing the glass with the protective materials onto the stage base illustrated in FIG. 9 in a flat state.
Figure 16:
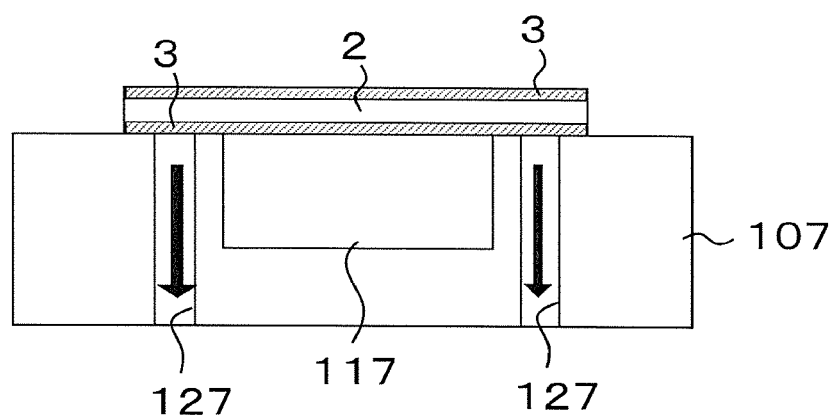
FIG. 16 is a view for illustrating a method of fixing the glass with the protective materials onto the stage base illustrated in FIG. 9 in a flat state.
Figure 17:
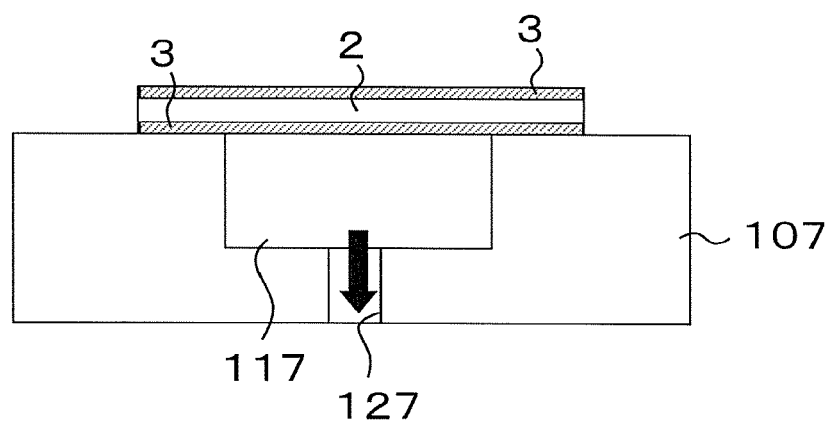
FIG. 17 is a view for illustrating a method of fixing the glass with the protective materials onto the stage base illustrated in FIG. 9 in a flat state.

As a method of fixing the glass 1 with the protective material horizontally, there are given a method of bonding the protective material 3 in slightly large size not only to the glass 2 but also to the stage base 107 as illustrated in FIG. 13, a method of fixing the entire periphery of or a half or larger portion of a periphery of the glass 1 with the protective materials with a fixing tape 8 as illustrated in FIG. 14, a fixing method of providing fixing tools 9 on the stage base 107 by using screws and pressing a portion of the glass 2 other than a range to be processed toward the stage base 107 as illustrated in FIG. 15, and the like. Further, besides the method illustrated in FIG. 15, a method of pressing the portion of the glass 2 other than the portion to be processed at several positions with fixing tools may be used. For example, there are given a method of sucking air through suction holes 127 formed in the stage base 107 to fix the periphery other than the portion to be processed to the stage base 107 through vacuum suction as illustrated in FIG. 16, and a fixing method of sucking air through the suction holes 127 formed in the stage base 107 to slightly suck a hollow portion 117 formed in the stage base 107, which is not brought into contact with the portion to be processed, as illustrated in FIG. 17. In all of FIG. 13 to FIG. 17, the stage base 107 for the through-hole processing is illustrated.

In order to externally exhaust the molten debris 4 and the scattered debris 5 of the glass 2 inside the glass 2 during the laser processing, the protective material 3 is required to be processed. The protective material 3 is processed simultaneously with the glass 2, or the glass 2 is subsequently processed after the protective material 3 is processed. Therefore, in the laser processing, the processing cannot be performed when the material to be processed does not have the light absorption range in the wavelength range of the laser wavelength. For the protective material 3, in particular, a material that absorbs laser light with respect to the wavelength of the $CO_2$ laser is suitable. The wavelength of the $CO_2$ laser to be used is preferred to be from 9.0 µm to 11.0 µm.

Next, a method of releasing the protective material 3 from the glass 2 is described. By releasing the protective material 3 from the glass 2 after the laser processing (protective material releasing step), the molten debris 4 and the scattered debris 5 of the glass 2, which are generated during the processing, are removed. As a method of releasing the protective material 3 from the glass 2 after the laser processing, there are given a method of releasing the protective material 3 by a worker with hands, and a method of releasing an end of the protective material 3 by using a tool such as a roll, and the like.

In the present invention, in order to prevent generation of an excessive stress that may be applied from the protective material 3 to the glass 2, the plurality of base materials 31 and 32 are released one by one instead of releasing the entire protective material 3 at a time. By the method described above, the generation of cracks in the glass 2 is reduced at the time of releasing the protective material 3.

As described above, according to the laser processing method of the first embodiment of the present invention, in the laser processing performed on the thin glass 2 having a thickness of 300 µm or smaller, the protective material 3 including the plurality of, that is, two or more base materials 31 and 32 is used. As a result, the thickness required for the protective material 3 to obtain the heat resistance can be maintained while the effects of warpage are suppressed. Thus, the adhesion of the molten debris 4 and the scattered debris 5 to the glass 2 can be prevented even under the high-energy density condition. Further, the warpage of the glass 1 with the protective material can be further reduced by being fixed onto the stage base 107 in a flat state. As a result, a uniformly processed shape can be obtained. Further, the base materials 31 and 32 are released one by one. Therefore, the generation of the crack 22 in the glass 2 can be reduced at the time of releasing the protective material 3.

Second Embodiment

In this embodiment, the condition for the high energy density is set to 200 J/cm$^2$ or higher. Under the low energy density condition, the heat-affected zone is formed around the drilled hole 21. In order to reduce the heat-affected zone, the laser beam 101 having a high energy density is required to be used.

In laser drilling, a taper of the drilled hole 21 becomes higher as the energy density increases. Therefore, for the laser processing on the glass 2, processing with the laser beam 101 having a high energy density is desired.

An example in which a micro-hole having a diameter of about 70 μm is processed in a borosilicate glass having a thickness of 100 μm by the pulse $CO_2$ laser is now described. A radiation condition for the laser beam 101 is set to the energy density of 500 $J/cm^2$. The base materials 31 and 32 are made of polyethylene terephthalate.

A thickness of the base materials 31 and 32 is desired to be smaller than 100 μm based on a precondition that the glass 2 can be processed when the laser beam is radiated onto the protective material 3.

As a countermeasure method for preventing the warpage of the glass 1 with the protective material, a portion of the glass 2 other than the portion to be processed is fixed onto the stage base 107 through vacuum suction. The remaining configuration is the same as that of the first embodiment.

As in the related art, when the through-hole is formed as the drilled hole 21 with the protective material 3 including the single base material having the thickness of 100 μm after the protective material 3 is bonded onto the glass 2, the adhesion of the molten debris 4 and the scattered debris 5 to the glass 2 can be prevented. However, when the protective material 3 is released from the glass 2, the crack 22 is generated in the periphery of the drilled hole 21 and in the glass 2.

On the other hand, when the thickness of each of the base materials 31 and 32 is set to 50 μm and the protective material 3 including the two base materials 31 and 32 to have a thickness of 100 μm is used for the glass 2 having a thickness of 100 μm, the adhesion of the molten debris 4 and the scattered debris 5 to the glass 2 can be prevented as in the related art. Further, the base materials 31 and 32 are released one by one. Therefore, the crack 22 is not generated in the glass 2.

As described above, according to the laser processing method of the second embodiment of the present invention, under the processing condition at the high energy density of 200 $J/cm^2$ or higher, the generation of the crack at the time of releasing the protective material 3 can be suppressed. At the same time, the adhesion of the molten debris 4 and the scattered debris 5 to the glass 2 can be prevented.

Although the structure of the protective material 3 including the base materials 31 and 32, each having the same thickness, has been described in the second embodiment described above, the protective material 3 may have a structure including the base materials 31 and 32 having different thicknesses. For example, the protective material 3 may include the base material 31 having a thickness of 40 μm and the base material 32 having a thickness of 60 μm.

Further, although the structure of the protective material 3 including the base materials 31 and 32 having a total thickness value of 100 μm has been described in the second embodiment described above, the total thickness value of the base materials 31 and 32 may be other than 100 μm. For example, the protective material 3 may have a structure including the base material 31 having a thickness of 50 μm and the base material 32 having a thickness of 75 μm. Even in this case, the generation of the crack in the glass 2 is suppressed at the time of releasing the protective material 3. At the same time, the adhesion of the molten debris 4 and the scattered debris 5 to the glass 2 can be prevented. As a result, the glass 2 can be uniformly processed.

Further, although the structure of the protective material 3 including the two base materials 31 and 32 has been described in the second embodiment described above, the protective material 3 may also have a structure including three or more base materials. For example, the protective material 3 may have a structure including three base materials, each having a thickness of 30 μm.

Third Embodiment

A third embodiment of the present invention differs from the invention described in the first embodiment in that the adhesives 33 and 34 are water-soluble. The remaining structure is the same as that of the first embodiment.

The adhesive 33 to be applied onto the glass 2 is required to sufficiently bond the glass 2 and the base material 31 to each other. Even when the adhesive 33 is water-soluble, sufficient adhesion to prevent the presence of the air bubbles 6 and the molten debris 4 of the glass 2 between the glass 2 and the base material 31 is only needed.

The adhesives 33 and 34 are water-soluble. Therefore, the base materials 31 and 32 are released from the glass 2 by washing with water. As a result, the generation of the crack 22 in the glass 2 is suppressed at the time of releasing the base materials 31 and 32 from the glass 2. Further, when the laser processing can be performed on the glass 1 with the protective material, the thickness of the protective material 3 including the base materials 31 and 32 and the adhesives 33 and 34 is not particularly limited. The adhesives 33 and 34 are water-soluble. Therefore, the protective material 3 may have a structure including a single base material. In this case, the base material may have a plate-like shape.

As the water-soluble adhesives 33 and 34, there are given polyvinyl alcohol, methylcellulose, and the like.

Not only the adhesives 33 and 34 but also the entire protective material 3 may be water-soluble. Even in a case where the protective material 3 is water-soluble, the generation of the crack 22 in the glass 2 can be suppressed when the protective material 3 is removed from the glass 2 by washing with water. As a method of forming the protective material on the glass 2 in this case, spin coating and the like are given. A film of the protective material 3 is formed in advance on a surface of the glass 2 to be processed. After the processing, the glass 1 with the protective material is washed to release the film together with the molten debris 4 from the glass 2. The water-solubility of the protective material 3 is desirable in view of simplicity of the film formation and in environmental aspects.

Further, the adhesives 33 and 34 are not all required to be water-soluble. For example, only the adhesive 33 (FIG. 1) may be water-soluble. Even in this case, by washing the glass 1 with the protective material, the base materials 31 and 32 can be released all together from the glass 2. Alternatively, for example, only the adhesive 34 (FIG. 1) may be water-soluble. In this case, the base material 32 is released from the base material 31 by washing the glass 1 with the protective material. Thereafter, the base material 31 is released from the glass 2.

As described above, according to the laser processing method of the third embodiment of the present invention, the adhesives 33 and 34 are water-soluble. Therefore, the protective material 3 can be released from the glass 2 by washing with water. As a result, the stress applied to the glass 2 is reduced when the protective material 3 is released from the glass 2. As a result, the generation of the crack 22 in the glass 2 can be prevented during the laser processing and at the time of releasing the protective material 3.

Fourth Embodiment

In a fourth embodiment of the present invention, there is described a method of forming the protective material 3 including a plurality of base materials on the glass 2, specifically, a method of forming the protective material 3 on the glass 2 with a feature in different directions of formation of the base materials on the glass 2.

In the through-hole formation step in which the through-hole passing through the glass 2 in the thickness direction is formed by the laser processing, the molten debris 4 and the scattered debris 5 are generated not only on the front surface of the glass 2 but also on the back surface thereof. Therefore, the protective materials 3 are reliably bonded to both surfaces of the glass 2. The protective materials 3 also have the effect of reducing the heat-affected zone and the crack 22, which are generated during the laser processing.

Figure 18:
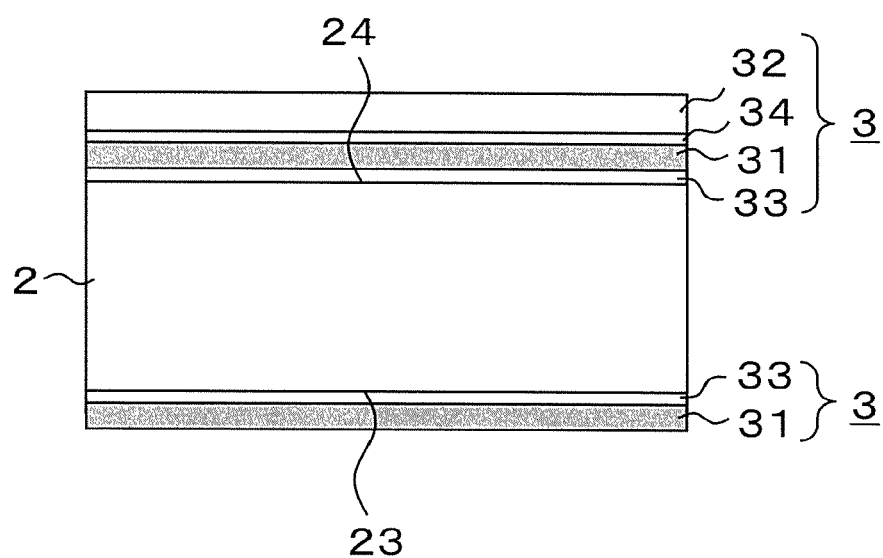
FIG. 18 is a side view for illustrating a glass with protective materials according to a fourth embodiment of the present invention.

FIG. 18 is a side view of the glass with the protective materials according to the fourth embodiment of the present invention. Although the protective materials 3, each including the two base materials, may be formed on both the surfaces of the glass 2 as illustrated in FIG. 6, the protective material 3 formed on a back surface (second surface) 23 of the glass 2 includes the single base material 31 in the fourth embodiment as illustrated in FIG. 18.

In the fourth embodiment, the laser beam is not directly radiated onto the back surface 23 side of the glass 2 to process the glass 2. Therefore, the protective material 3 formed on the back surface 23 of the glass 2 is not required to have the heat resistance as high as that required for the protective material 3 formed on a front surface (first surface) 24 of the glass 2. Accordingly, the protective material 3 formed on the back surface 23 of the glass 2 may have a structure including the single base material 31.

The formation of the protective materials 3 on both the surfaces of the glass 2 can prevent the adhesion of dirt to or the generation of a flaw in the glass 2. Therefore, the effect of preventing strength of the glass 2 from being impaired is also obtained.

A value of a Young's modulus of the glass 2 is half or smaller than that of silicone, which is similarly a brittle material. Therefore, when the film thickness of the protective material 3 is large, the glass 2 is pulled by the protective material 3 to be liable to be warped at the time of formation of the protective material on the glass 2. Thus, when the protective material 3 including the plurality of base materials is formed as illustrated in FIG. 1, FIG. 5, FIG. 6, and FIG. 18, it is desired that the base materials be bonded one by one.

For example, when the protective material 3 including the single base material and the protective material 3 including the plurality of base materials, both the protective materials 3 having the same thickness, are compared with each other, the protective material 3 formed by bonding the plurality of base materials on the glass 2 one by one can more relax the stress in the adhesive layer interposed between the base materials adjacent to each other. Therefore, the warpage of the glass 2 on which the protective material 3 is formed can be suppressed.

Figure 19:
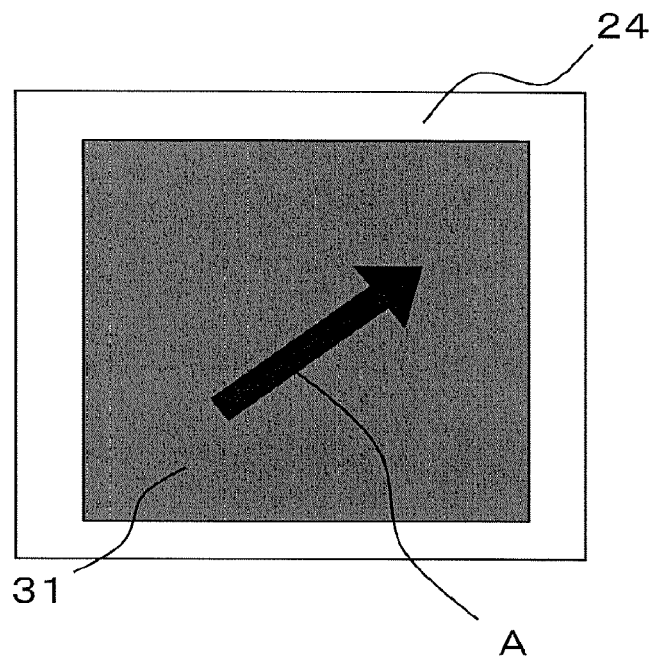
FIG. 19 is a plan view for illustrating bonding of a base material applied with an adhesive to the glass illustrated in FIG. 18.
Figure 20:
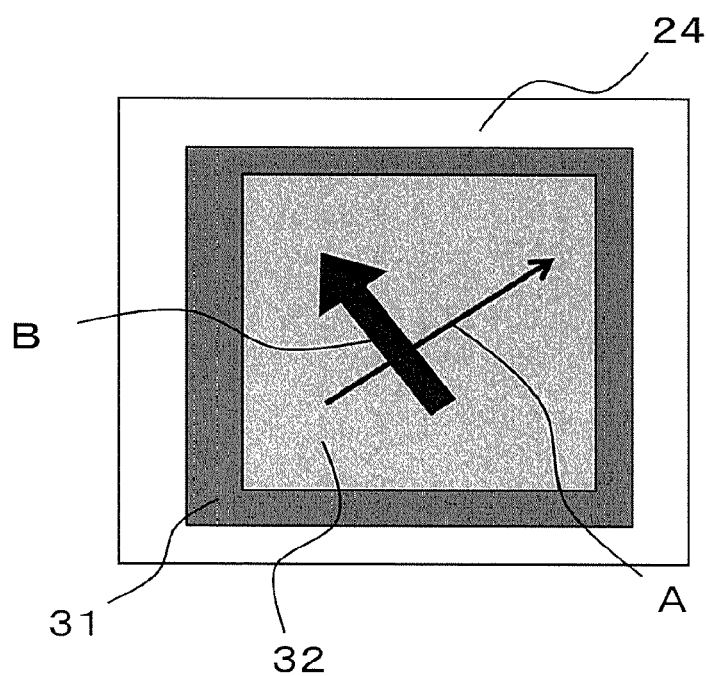
FIG. 20 is a plan view for illustrating bonding of a base material applied with an adhesive to the base material illustrated in FIG. 19.

FIG. 19 is a plan view for illustrating bonding of the base material 31 applied with the adhesive to the glass 2 illustrated in FIG. 18, and FIG. 20 is a plan view for illustrating bonding of the base material 32 applied with the adhesive to the base material 31 illustrated in FIG. 19. In the description given above, there has been described a method of relaxing the stress applied to the glass 2 with the protective material 3 by replacing the protective material 3 including the single base material having a large thickness with the protective material 3 including the plurality of base materials. The stress applied to the glass 2 can be relaxed not only by the structure of the protective material 3 but also by a method of forming the protective material 3 on the glass 2.

In a case where the protective material 3 including the two base materials 31 and 32 is formed on the glass 2, the protective material 3 is bonded onto the glass 2 so that a direction A of formation of the first base material 31 formed on the glass 2 and a direction B of formation of the base material 32 to be subsequently formed differ from each other. In this example, the direction of formation of the base material corresponds to a direction of bonding of the base material.

It is desired that the base materials be bonded so that the direction of formation of the first base material 31 and the direction of formation of the second base material 32 cross at right angles each other as much as possible.

When the base material 31 is formed on the glass 2, the base material 31 is pressed against the glass 2 under a state in which the adhesive 33 is applied onto the base material 31 or the glass 2 so as not to generate air bubbles between the glass 2 and the base material 31. In particular, when the base material 31 is manually formed on the glass 2, the base material 31 is sometimes formed in a tensioned fashion to generate the stress on the glass 2. In order to relax the stress, the base materials are bonded so that the direction of formation of the first base material 31 and the direction of formation of the second base material 32 cross at right angles each other as much as possible.

Each of the adhesives 33 and 34 and the base materials 31 and 32 to be used has a uniform overall dimension in the thickness direction. The adhesive 34 is applied over a surface of the base material 32 on the base material 31 side or a surface of the base material 31 on the base material 32 side. The adhesive 34 only needs to have a pressure-sensitive adhesive strength that is enough to prevent the base material 32 from releasing from the base material 31 during the processing. Therefore, for the purpose of relaxing the stress, the pressure-sensitive adhesive strength is not required to be so high. However, in order to prevent the base materials 31 and 32 from releasing at the same time, the pressure-sensitive adhesive strength of the adhesive 34 is required no to be higher than the pressure-sensitive adhesive strength of the adhesive 33.

When the pressure-sensitive adhesive strength of the adhesive 33 is low, the protective material 3 is released from the glass 2 during the laser processing even after the protective material 3 is bonded onto the glass 2 so that the foreign substance such as air bubbles or dust is not present between the base material 31 and the glass 2. As a result, the molten debris 4 or the scattered debris 5 is caught in a gap between the protective material 3 and the glass 2. Therefore, it is desired that the pressure-sensitive adhesive strength of the adhesive 33 be from 0.05 N/20 mm to 1.0 N/20 mm.

The adhesive 33 and the adhesive 34 are made of different kinds of materials from each other.

A dimension of the base material 31 (first base material) to be bonded to the glass 2 in the thickness direction is preferably smaller than a dimension of the base material 32 to adhere to the base material 31 in the thickness direction. The base material 31 is bonded to the glass 2, and hence the stress applied to the glass 2 is significant. In order to relax the stress applied to the glass 2, the dimension of the base material 31 in the thickness direction is preferably set smaller than the dimension of the base material 32 in the thickness direction. Further, for the through-hole processing or cutting, the base material 31 of the protective material 3 formed on the back surface 23 of the glass 2 is also bonded to the glass 2. Therefore, the dimension in the thickness direction is preferably set small. For the same reason, a stiffness of the base material 32 may be set lower than a stiffness of the base material 31. In a case of the protective material 3 including three or more superimposed base materials, the dimension of the base material 31 in the thickness direction, which is formed so as to be located closest to the glass 2, is set smaller than the dimension of the base material in the thickness direction, which is formed so as to be located farther away than the base material 31 from the glass 2.

As the material of the base material 32, a material having a heat resistant temperature higher than that of the material of the base material 31 is used. The base material 32 is irradiated with the laser beam. Therefore, a larger part of the base material 32 disappears as compared with the base material 31. Therefore, in order to improve the heat resistance of the protective material 3, the base material 32 having high heat resistance is used. The base materials 31 and 32 are made of different kinds of materials from each other.

The size of the protective material 3 affects ease of release of the base materials 31 and 32. For example, when the protective material 3 including the two base materials 31 and 32 is formed on the front surface of the glass 2 as illustrated in FIG. 1, it is desired that the size of the base material 32 be smaller than the size of the base material 31. Here, the size of the protective material 3 means the area of the protective material 3 as viewed from above. When the base material 32 is larger than the base material 31, there is a possibility in that the base material 31 is released from the glass 2 together therewith in a state of being bonded to the base material 32 at the time of releasing the base material 32. In this case, the release is equivalent to release of the single thick protective material 3. Therefore, the base material 32 bonded to the base material 31 is set smaller than the base material 31 bonded onto the glass 2.

Further, for ease of release of each of the base materials, the protective material 3 including the plurality of base materials may have a crease formed in an end portion of the base material or may have a portion without an adhesive at an end portion of the base material.

Note that, for the base materials and the adhesives, a method of forming the protective material is not limited to that described above, and other methods may be used.

Figure 21:
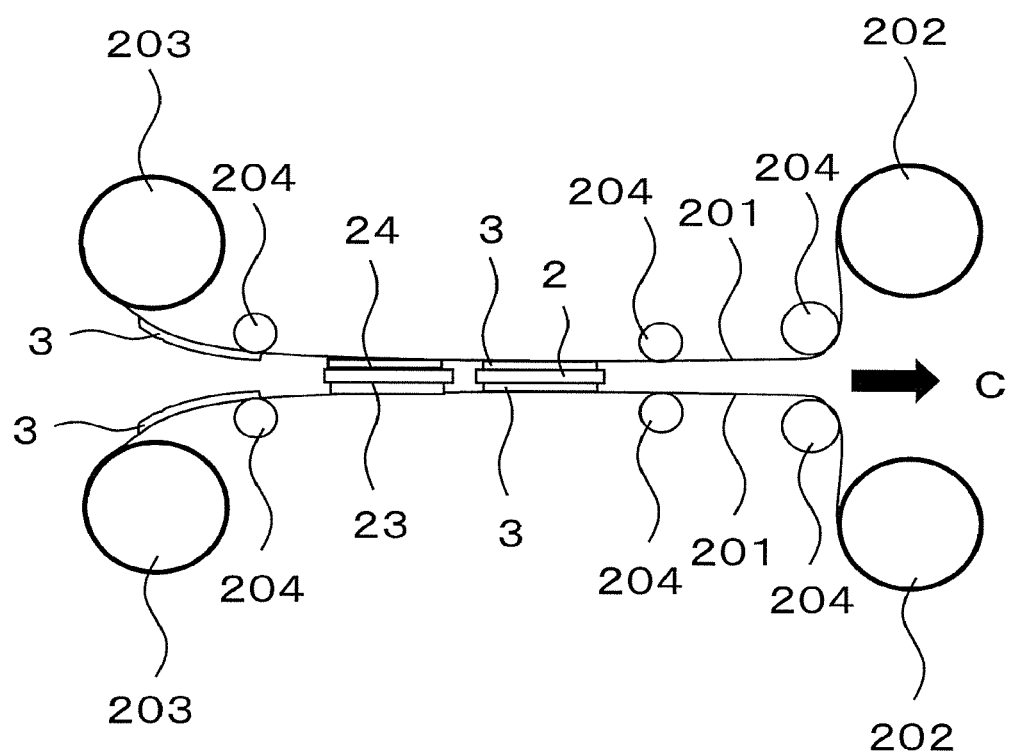
FIG. 21 is a side view for illustrating bonding of a pair of protective materials simultaneously onto a front surface and aback surface of the glass by using rolls.

Further, in the protective material formation step, the pair of protective materials 3 bonded to the front surface 24 and the back surface 23 of the glass 2 may be simultaneously bonded onto the glass by using rolls, as illustrated in FIG. 21. In FIG. 21, a pair of protective material bonding apparatus, each including a sheet 201 on which the protective material 3 is mounted, a roll 22 configured to rewind the sheet 201, a roll 203 configured to feed the sheet 201, and a plurality of rolls 204 configured to guide the sheet 201, is illustrated. The glass 2 is inserted between portions of the sheets 201, which are opposed to each other. After a feeding direction of the opposed portions of the sheets 201 and a traveling direction C of the glass 2 are aligned with each other, the protective materials 3 are bonded onto the front surface 24 and the back surface 23 of the glass 2.

As described above, according to the laser processing method of the fourth embodiment of the present invention, the stress applied to the glass 2 can be relaxed by changing the direction of formation of each of the base materials on the glass 2. Therefore, the generation of the crack in or the occurrence of breakage of the glass 2 is reduced to enable the drilled holes to be uniformly formed in the glass 2.

The invention claimed is:

1. A laser processing method, comprising:
a protective material formation step of forming protective materials on both of first and second surfaces of a glass;
a laser processing step of radiating a laser beam onto the first surface of the glass after the protective material formation step, wherein the glass has the protective materials formed thereon, to form a drilled hole in the glass; and
a protective material releasing step of releasing the protective materials from the first and second surfaces of the glass after the laser processing step,
wherein, in the protective material formation step, a dimension in a thickness direction of the protective material formed on the first surface of the glass is larger than a dimension in a thickness direction of the protective material formed on the second surface of the glass, wherein:
the protective material formation step comprises:
forming the protective material including a plurality of base materials on the first surface; and
forming the protective material including one or more base materials on the second surface,
wherein, in the protective material formation step, an area of a first base material of the plurality of base materials formed on the first surface, the first base material corresponding to the base material formed so as to be located closest to the glass among the plurality of base materials, is larger than an area of a second base material of the plurality of base materials formed on the first surface, the second base material being formed so as to be located farther away from the Mass than the first base material.

2. A laser processing method according to claim 1, wherein the laser beam comprises a pulse $CO_2$ laser.

3. A laser processing method according to claim 1, wherein the protective material formation step comprises bonding a pair of the base materials on the first surface that are adjacent to each other, in bonding directions parallel to the first and second surfaces of the glass, which bonding directions are different from each other.

4. A laser processing method according to claim 1, wherein, in the protective material formation step, a dimension in a thickness direction of the first base material of the plurality of base materials formed on the first surface, the first base material corresponding to the base material formed so as to be located closest to the glass among the plurality of base materials, is smaller than a dimension in a thickness direction of the second base material of the plurality of base materials formed on the first surface, the second base material being formed so as to be located farther away from the glass than the first base material.

5. A laser processing method according to claim 1, wherein the base materials of the protective material on the first surface including the plurality of base materials are made of different kinds of materials.

6. The laser processing method according to claim 5, wherein, in the protective material formation step, a heatproof temperature of the first base material of the plurality of base materials formed on the first surface, the first base material corresponding to the base material formed so as to be located closest to the glass among the plurality of base materials, is lower than a heatproof temperature of the second base material of the plurality of base materials formed on the first surface, the second base material being formed so as to be located farther away from the glass than the first base material.

7. A laser processing method according to claim 1, wherein an adhesive provided between the glass and the first base material and an adhesive provided between the plurality of base materials adjacent to each other are made of different kinds of materials.

8. A laser processing method according to claim 1, wherein the drilled hole formed in the laser processing step comprises a through-hole passing through the glass.

9. A laser processing method according to claim 1, wherein, in the protective material formation step, a pair of the protective materials to be bonded onto the first and second surfaces of the glass is bonded simultaneously onto the glass by using rolls.

\* \* \* \* \*